US009002584B2

(12) United States Patent
Van Wiemeersch et al.

(10) Patent No.: US 9,002,584 B2
(45) Date of Patent: Apr. 7, 2015

(54) RAIN ONSET DETECTION GLAZING AUTO-CLOSE

(71) Applicant: Ford Global Technologies, LLC, Dearborn, MI (US)

(72) Inventors: John Robert Van Wiemeersch, Novi, MI (US); Patrick Kevin Holub, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/847,033

(22) Filed: Mar. 19, 2013

(65) Prior Publication Data

US 2014/0288784 A1 Sep. 25, 2014

(51) Int. Cl.
*B60R 22/00* (2006.01)
*G09G 5/00* (2006.01)
*E05F 15/00* (2006.01)
*E05F 15/20* (2006.01)

(52) U.S. Cl.
CPC ......... *E05F 15/0008* (2013.01); *E05F 15/2007* (2013.01); *E05Y 2900/542* (2013.01); *E05Y 2400/44* (2013.01); *E05Y 2900/55* (2013.01)

(58) Field of Classification Search
USPC ............................................ 701/46; 345/633
See application file for complete search history.

(56) References Cited

U.S. PATENT DOCUMENTS

| | | | | |
|---|---|---|---|---|
| 4,613,802 | A * | 9/1986 | Kraus et al. | 318/483 |
| 5,293,105 | A * | 3/1994 | West, Jr. | 318/483 |
| 5,321,345 | A | 6/1994 | Lambros et al. | |
| 5,402,075 | A * | 3/1995 | Lu et al. | 324/664 |
| 5,459,380 | A * | 10/1995 | Augustinowicz | 318/483 |
| 6,094,981 | A | 8/2000 | Hochstein | |
| 6,933,831 | B2 * | 8/2005 | Ieda et al. | 340/5.72 |
| 7,106,172 | B2 | 9/2006 | Neveux et al. | |
| 7,513,148 | B2 | 4/2009 | Mouridsen | |
| 7,548,809 | B2 * | 6/2009 | Westerhoff | 701/49 |
| 2001/0052839 | A1 | 12/2001 | Nahata et al. | |
| 2005/0219043 | A1 * | 10/2005 | Pollmann et al. | 340/426.28 |
| 2009/0021112 | A1 * | 1/2009 | Kondou et al. | 310/319 |
| 2010/0019510 | A1 | 1/2010 | Ieda et al. | |
| 2010/0136917 | A1 | 6/2010 | Castandet | |
| 2011/0190962 | A1 * | 8/2011 | Peterson et al. | 701/2 |
| 2012/0200388 | A1 * | 8/2012 | Miura et al. | 340/5.51 |

* cited by examiner

*Primary Examiner* — Thomas G Black
(74) *Attorney, Agent, or Firm* — Frank A. MacKenzie; Brooks Kushman P.C.

(57) ABSTRACT

A vehicle system may include a plurality of exterior capacitive sensors, such as door handles, and a controller in communication with the plurality of capacitive sensors. The controller may be configured to identify a rain condition based on sensor data received from at least one of the exterior capacitive sensors of the vehicle; ensure an absence of a key fob in proximity of the at least one locked handle and an absence of a subsequent door opening occurrence when unlocked to confirm the rain condition; and initiate a closure action to a power actuator associated with an open vehicle window for a confirmed rain condition.

24 Claims, 4 Drawing Sheets

RAIN ONSET DETECTION GLAZING AUTO-CLOSE

BACKGROUND

Systems have been proposed for closing powered vehicle windows (windows including, but not limited to, for example, front and rear door windows, window side vents, sunroofs, moon-roofs, and convertible roofs) in the event of rain. These systems typically use dedicated rain sensors, and perform automatic window close actions based on detected precipitation. These approaches may seem logical, but they are not cost effective in terms of parts cost or in terms of key-off-load (KOL) electrical current budget for a parked vehicle. Adding a sensor solely to monitor for rain proves difficult from a business perspective, as rain entering windows is a relatively unlikely scenario. Thus, while auto-close window features may be welcome for little to no additional cost, customers may be unwilling to pay extra for such a rarely used option.

To address the cost of additional sensors, some systems propose use of existing windshield rain sensors employed to activate or change wiper speed according to windshield wetness. These systems may sample the windshield rain sensor while the vehicle is off, and may provide an auto-close feature upon detection of wet glass. However, such systems are impractical for vehicles lacking smart wiper systems, and are not cost-effective from a KOL perspective, as windshield rain sensors consume considerable KOL while active. To keep additional KOL manageable, the windshield rain sensors may be sampled at intervals long enough to reduce the effectiveness of such a system below acceptable limits.

As yet a further disadvantage, such systems fail to take into account safety considerations for animals or persons that may be in the vehicle cabin when an auto-close event occurs. For instance, if rain conditions yield to sunny weather, the vehicle cabin may experience a dangerous increase in temperature due to increased sun load.

SUMMARY

A method may include identifying, by a vehicle controller, a rain condition based on sensor data received from at least one capacitive handle of a vehicle; ensuring an absence of a key fob in proximity of the at least one locked capacitive handle and an absence of a subsequent door opening occurrence when unlocked to confirm the rain condition; and initiating a closure action to a power actuator associated with an open vehicle window for the confirmed rain condition.

A system may include a plurality of capacitive door handles of a vehicle; and a controller in communication with the plurality of door handles and configured to: identify, by a vehicle controller, a rain condition based on sensor data received from at least one capacitive handle of a vehicle; ensure an absence of a key fob in proximity of the at least one handle and an absence of a door opening occurrence to confirm the rain condition; and initiate a closure action to a power actuator associated with an open vehicle window for a confirmed rain condition.

A non-transitory computer readable medium may store a software program executable by a processor of a controller to provide operations including: identifying, by a vehicle controller, a rain condition based on sensor data received from at least one capacitive handle of a vehicle; ensuring an absence of a key fob in proximity of the at least one handle and an absence of a door opening occurrence to confirm the rain condition; and initiating a closure action to a power actuator associated with an open vehicle window for the confirmed rain condition.

DETAILED DESCRIPTION

Figure 1:
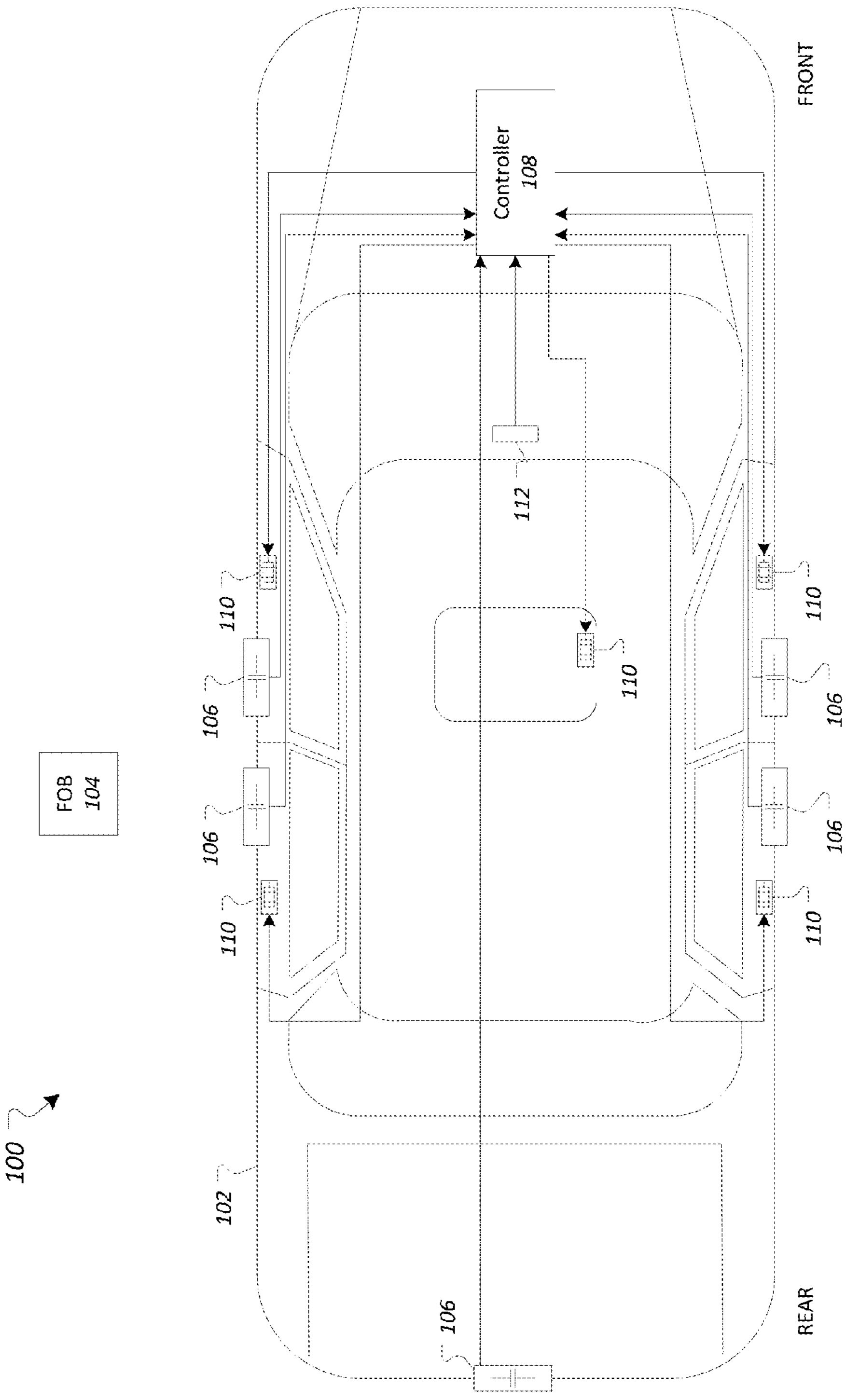
FIG. 1 illustrates an exemplary system of a vehicle for rain detection and window, sunroof or vent closure.

FIG. 1 illustrates an exemplary system 100 of a vehicle 102 for rain detection and window, sunroof or vent closure. The system 100 may include aspects of a passive keyless entry/passive start (PEPS) system for rain detection, and may include aspects of a power window system to provide for window closure (e.g., closure of front and rear door power windows, powered window side vents, power sunroofs and moon-roofs, as some examples). The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

In a PEPS system, an owner may carry an electronic transmission device, such as a PEPS key fob 104, to allow for "keyless" entry to the vehicle 102. To initiate a door unlock sequence, the owner may touch or move in close proximity to a PEPS handle capacitive sensor 106 of a vehicle 102 door handle. Upon on an identification of the potential presence of an owner by a capacitive sensor 106, a controller 108 of the vehicle 102 may initiate a challenge-accept sequence with the key fob 104. The sequence may include the controller 108 sending a low-frequency key wake-up message to the key fob 104, and listening for a high-frequency response from the key fob 104 including an identification code. Upon receipt of the correct identification code, the vehicle controller 108 may unlock the vehicle 102 doors.

A vehicle 102 equipped with PEPS capacitive sensors 106 may have multiple capacitive sensors 106 on each door handle. For example, door handles may each have a capacitive sensor 106 for a locking function and a second capacitive sensor 106 for an unlocking function. A vehicle deck lid or tailgate may, typically, only have an unlock capacitive sensor 106. As another example, capacitive sensors 106 may include capacitive keypads utilized on some vehicles 102 to facilitate vehicle 102 entry upon receiving a correct key code entered into the keypad. Still other types of vehicle 102 capacitive sensors 106 may also be utilized by the system 100, such as any other exterior capacitive sensors that may be used for keyless entry purposes, such as lock/unlock, unlatch, or keypad operations.

The controller 108 may be configured to receive capacitive values from the capacitive sensors 106, and to identify a baseline level of capacitance. This may be done, for example, according to an average of the values received from the sensors, or according to data received from other environmental sensors of the vehicle 102. The baseline level of capacitance may drift up or down based on various environmental conditions, such as changes in air temperature or humidity. If the controller 108 detects a substantial change from the baseline level of capacitance during a relatively short period of time, the controller 108 may determine the potential presence of an owner. For instance, the capacitive sensors 106 may detect a change of capacitance based on an approaching presence of a human hand. Capacitive sensors 106 such as PEPS handle sensors 106 and keypad capacitive sensors 106 may also be sensitive to the onset of moisture. As such, the capacitive sensors 106 may be considered rain sensors sensitive to detection of a rain condition.

A vehicle 102 equipped with PEPS system may include one or more capacitive sensors 106 on each of a plurality of door handles, resulting in an array of sensors 106 that may be used for the detection of rain. For example, a vehicle 102 including two capacitive sensors 106 on each of four doors may be considered to have an array of eight rain sensors, while a vehicle 102 with two capacitive sensors 106 on the front two doors may be considered to have an array of four sensors. Further, on some vehicles 102 with a capacitive trunk release, the rear trunk release sensor 106 could allow for an array of nine rain sensors 106 on a four-door sedan or an array of five rain sensors 106 on a two-door sedan. Other vehicles 102 may include different arrays of capacitive sensors 106, such as keypad capacitive sensors 106 to unlock associated vehicle doors. Nevertheless, since PEPS keyless entry systems may be standard on many vehicles 102, and since the PEPS handle capacitive sensors 106 may be active when the vehicle 102 is off to facilitate keyless entry, use of the PEPS handle capacitive sensors 106 for rain detection provides the controller 108 with an array of capacitive sensors 106 that may be free of both incremental part cost and incremental KOL.

The controller 108 may be configured to receive sensor data from the PEPS handle capacitive sensors 106 indicative of relative levels of capacitance. These inputs to the controller 108 from the PEPS capacitive handle sensors 106 may be utilized to identify the onset of a rain condition. For example, if sensor data received from two or more capacitive sensors 106 includes relatively simultaneous changes in capacitance, and further, if the vehicle is locked, that no key fob 104 is detected by the controller 108 as being within the proximity of the exterior challenge zone of a door handle and, if the vehicle is unlocked, that there is an absence of a door opening occurrence within a prescribed time period after the detected change in capacitance, the controller 108 may conclude that there has been an onset of a rain condition. As another example, if sensor data received from at least one capacitive sensor 106 per door handle registers a detection of a change in capacitance which is not followed by a door opening occurrence for a door corresponding to the at least one capacitive sensor 106, then the controller 108 may conclude that there has been an onset of a rain condition.

In some cases, the controller 108 may implement a two-stage process to determine the onset of a rain condition. For example, based on receiving a change in capacitance from a PEPS handle capacitive sensor 106, in the absence of detection of a PEPS key fob 104 handle in proximity of the sensor 106 or a door opening occurrence, the system 100 may wake the vehicle 102 and look for secondary signs of rain before concluding that a rain condition exists. As some examples of secondary signs, the controller 108 may: activate a smart-wipe rain sensor 112 to identify whether the windshield appears wet, activate connectivity to a local weather information source via an embedded telematics modem to determine whether rain is predicted, use an onboard vehicle 102 humidity sensors to determine whether humidity levels are indicative of rain, compare lock and unlock capacitive sensors 106 on a given door handle for sensor data 202 confirming the rain condition, compare readings from other capacitive sensor 106 locations of the vehicle 102 for sensor data 202 confirming the rain condition, or use onboard vehicle 102 sun load sensors to identify the sun load presented to the vehicle 102. As a more specific example, the sun load sensors may be used to exclude capacitive sensor 106 data otherwise indicative of a window closure in the case of sun load values that are inconsistently high for a true rain condition. However, use of sun load sensors for confirmation of a rain condition may be limited to use during certain time periods, e.g., day time as determined according to onboard vehicle 102 date and time information, potentially supplemented by location information available to the vehicle (e.g., according to a navigation system or global positioning system receiver).

Upon determining a reasonable probability of rain, the controller 108 may be configured to take various actions. For example, the controller 108 may be configured to provide indications to power window actuators 110 configured to cause the various windows (e.g., front and rear door power windows, powered window side vents, power sunroofs and moon-roofs) of the vehicle 102 to close, thereby preventing the rain from entering the vehicle 102. In some cases, the controller 108 may identify that the vehicle doors are locked and that the closed vehicle window was previously open greater than a predefined window threshold (e.g., to facilitate access to the vehicle cabin). In such a case, the controller 108 may unlock at least one of the vehicle doors (e.g., the door whose window was closed) to maintain access to the vehicle 102. As another example, the controller 108 may be configured to alert the vehicle 102 owner of rain and request confirmation from the owner to close the windows. The alert may be sent to the owner, for example, based on contact information associated with a vehicle-based computing system of a vehicle, such as contact information associated with a vehicle account of the SYNC® system included on vehicles manufactured by The Ford Motor Company of Dearborn, Mich.

In some examples, the controller 108 may be further configured to determine a conclusion of the rain condition. For example, similar to the determination of the onset of a rain condition, the controller 108 may detect a reverse change or a return in a level of capacitance to a baseline level of capacitance. Upon a determination of the end of a rain condition, the controller 108 may be configured to cause the windows of the vehicle 102 to reopen. For vehicles 102 that support the reporting of windows position information, the controller 108 may be configured to reopen the windows by recording a position of the windows before closure, and returning the windows to the recorded position upon detection of the conclusion of the rain condition. For vehicles 102 that do not support the reporting of windows position information, the controller 108 may, for example, record an amount of time taken to close a window, and may provide a reopen command to the window for the recorded amount of time upon detection of the conclusion of the rain condition.

Figure 2:
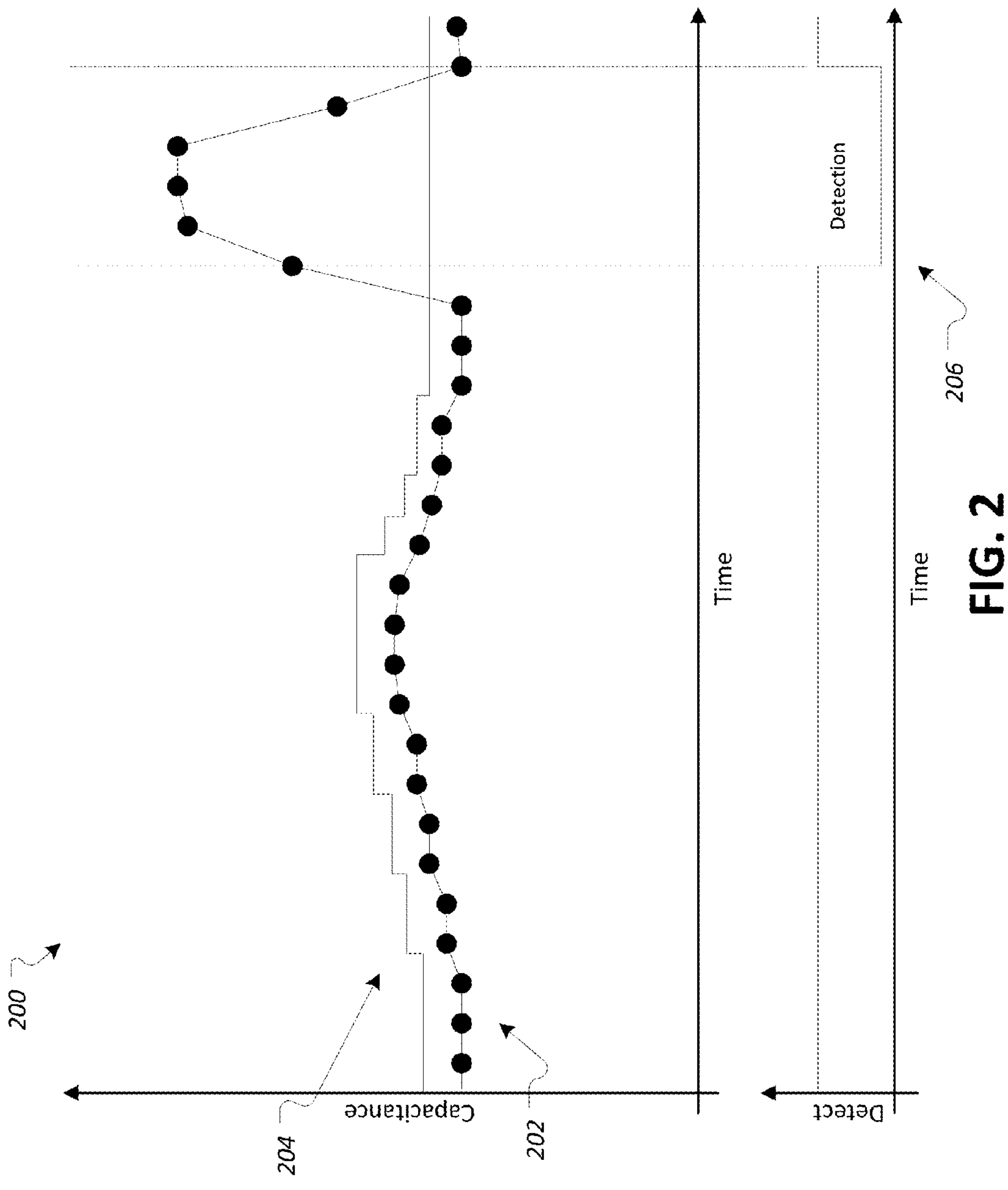
FIG. 2 illustrates an exemplary detection of a sudden rain condition using sensor data from a capacitive sensor and a detection threshold.

FIG. 2 illustrates an exemplary detection of a sudden rain condition using sensor data 202 from a capacitive sensor 106 and a detection threshold 204. The sensor data 202 may include data periodically sampled from a PEPS capacitive sensor 106. The controller 108 may receive the raw sensor data 202, and may identify whether the received sensor data 202 changes in value beyond that of the detection threshold 204. In some examples the sensor 106 may process and assess capacitive changes and only report sudden changes to the controller 108. The detection threshold 204 may be set, in some examples, to be a predetermined distance above the current sensor data 202, or to be a predetermined distance above an average of the most recent samples of the sensor data 202. In some examples, the controller 108 may set the threshold level in the sensor or in controller 108 memory based at least in part on vehicle 102 specific information programmed into the vehicle 102 (e.g., during assembly) to compensate for different vehicle body styles and handle styles in which a common handle capacitive sensor 106 may be utilized. In some cases, the detection threshold 204 may be the threshold used to determine a potential presence of an owner by the capacitive sensor 106. If the controller 108 determines that the received sensor data 202 has changed in value beyond that of the detection threshold 204, then the controller 108 may identify that the sensor data 202 is indicative of the onset of a rain condition.

If the controller 108 instead determines that the received sensor data 202 has changed in value without triggering the detection threshold 204, then the controller 108 may selectively adjust the detection threshold 204 according to the new sample. Accordingly, the controller 108 may be able to selectively adjust the detection threshold 204 to account for changes in humidity and temperature, thereby maintaining a relative detection threshold 204 as an offset change in capacitance.

Moreover, if the controller 108 determines that the received sensor data 202 has changed in value back below the detection threshold 204, then the controller 108 may identify the conclusion of the rain condition.

Figure 3:
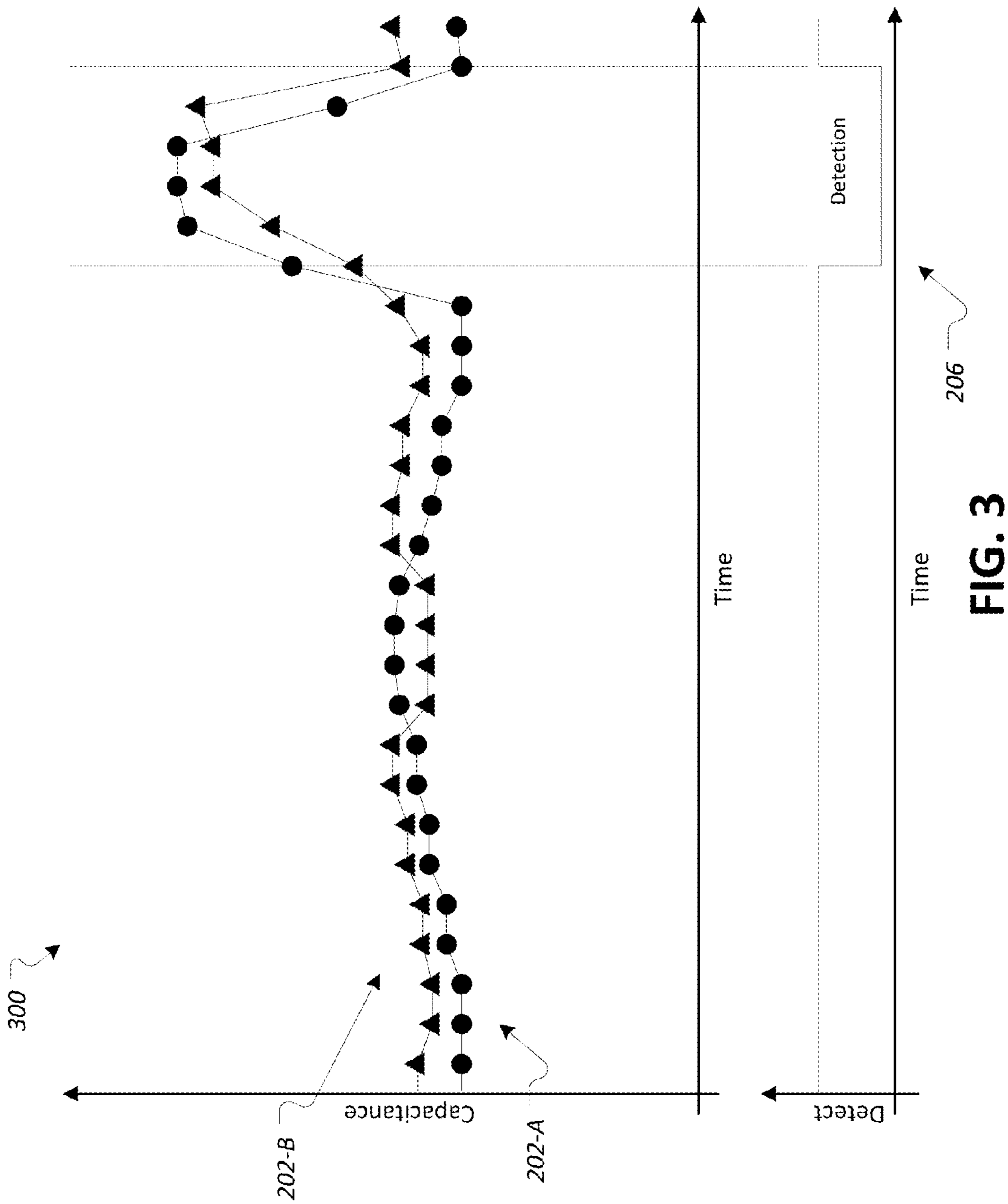
FIG. 3 illustrates an exemplary detection of a rain condition using sensor data from a plurality of capacitive sensors.

FIG. 3 illustrates an exemplary detection of a rain condition using sensor data 202 from a plurality of capacitive sensors 106. As illustrated, the sensor data 202-A may include data periodically sampled from a first PEPS capacitive sensor 106-A, while the sensor data 202-B may include data periodically sampled from a second PEPS capacitive sensor 106-B. The controller 108 may receive the sensor data 202-A and 202-B, and may identify a rain condition based on identification of a substantially simultaneous or otherwise relatively consistent change across the sensor data 202-A and 202-B in the absence of a door opening occurrence. As shown, based on an identification of a relatively large change in capacitance in the sensor data 202-A and also in the sensor data 202-B, the controller 108 identifies an indication of a rain condition. Moreover, based on a further determination that the received sensor data 202-A and 202-B have each changed in value back to a baseline level of capacitance, the controller 108 may further identify a conclusion of the rain condition.

It should be noted that variations on the exemplary capacitive measurements and use of this information to determine the onset of rain conditions are possible. For instance, while capacitive measurements includes a detection of a rain condition using two PEPS capacitive sensors 106, it should be noted that greater numbers of capacitive sensors 106 may be utilized as well. Moreover it should further be noted that use of detection thresholds 204 as described with respect to FIG. 2 may further be utilized with respect to multiple sensors 106 as described with respect to FIG. 3.

Figure 4:
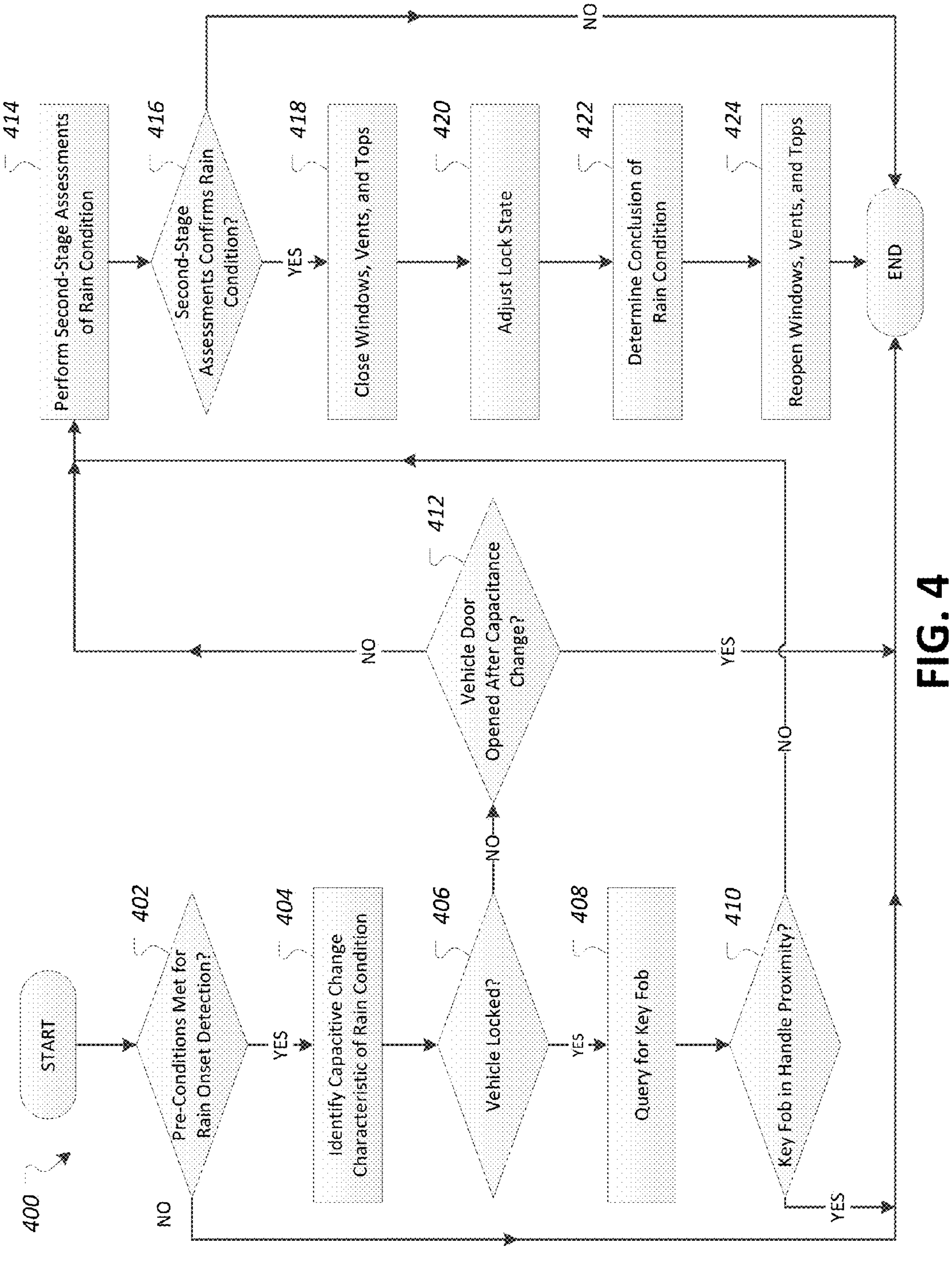
FIG. 4 illustrates an exemplary process for rain detection and automated window closure.

FIG. 4 illustrates an exemplary process 400 for rain detection and automated window closure. The process 400 may be performed by various devices, such as by a controller 108 of a vehicle 102 in communication with one or more capacitive sensors 106.

In block 402, the controller 108 identifies whether preconditions are met for activation of rain onset detection. For instance, the rain sense feature may be enabled if the vehicle has all doors closed and is not in a driving gear (e.g., the vehicle is in Park or Neutral). If the pre-conditions are met, control passes to block 404. Otherwise, the process 400 ends.

In block 404, the controller 108 identifies a capacitive change characteristic of a rain condition. As some examples, the controller 108 may detect a rain condition using sensor data 202 from a capacitive sensor 106 and a detection threshold 204 as discussed above with respect to FIG. 2, or may detect a rain condition using sensor data 202 from a plurality of capacitive sensors 106 as discussed above with respect to FIG. 3.

In decision point 406, the controller 108 determines whether the vehicle 102 was parked with the doors electronically locked. In some scenarios, such as in the case of a family picnic or parked in the home driveway, users may leave their vehicles 102 unlocked. When a vehicle 102 is unlocked, or if a door is ajar, many PEPS systems may not search for a PEPS fob 104. If the vehicle 102 is electronically unlocked, control passes to block 412. Otherwise, control passes to block 408.

In block 408, the controller 108 queries for a key fob 104 in proximity of the vehicle 102 handles. For example, the controller 108 may send a low-frequency key wake-up message to a key fob 104, and may listen for a high-frequency response from the key fob 104 including an identification code. If the key fob 104 is present, then the capacitive change may in fact be a result of an owner attempting entry of the vehicle 102, independent of a rain condition.

In decision point 410, the controller 108 determines whether or not the key fob 104 is in proximity of a vehicle 102 handle. For example, the controller 108 may determine whether the PEPS key fob 104 is within the handle low-frequency challenge zone of the door handles, indicating a normal PEPS passive entry operation. If no response is received from a key fob 104, or if no correct response is received from a key fob 104, or if the key fob 104 is determined to be within the vehicle cabin, then the controller 108 may conclude that the key fob 104 is not in the proximity of the vehicle 102 handle. If no key fob 104 is within handle proximity, control passes to block 414. Otherwise, the process 400 ends. In some cases, if the key fob 104 is detected, the process 400 may transition to, or return to, a key unlock process performed by way of the PEPS system.

In decision point 412, the controller 108 determines whether a vehicle 102 door is opened after the identified capacitance change detected by the capacitive sensors 106. This may be done to distinguish between conditions in which (a) the capacitance change is a result of user proximity to a handle of an unlocked door or (b) a result of rain. For example, a user may approach an unlocked vehicle without the key fob 104 in his or her possession and may open a door of the vehicle 102. In such an example, the identified capacitance change may be due to either a rain condition, a hand in proximity of the handle capacitive sensor 106, or both (e.g., a user racing to his or her vehicle 102 due to the rain). Moreover, it is also possible that two or more arriving passengers might grab door handles at nearly the same time to open the vehicle 102 doors. To distinguish between a rain condition and these other types of situations involving vehicle 102 entry, the controller 108 may be configured to look for a door opening occurrence within a predetermined time span (e.g., 2-3 seconds) coincident with, or just after, detection of a persistent large capacitance change on the vehicle door capacitive sensor 106 that detected a capacitance change characteristic of a rain condition.

In block 414, the controller 108 performs second-stage assessments of the presence of a rain condition. For example, the controller 108 may: activate a smart-wipe rain sensor 112 to identify whether the windshield appears wet, activate connectivity to a local weather information source via an embedded telematics modem to determine whether rain is predicted, use onboard vehicle 102 humidity sensors to determine whether humidity levels are indicative of rain, compare lock and unlock capacitive sensors 106 on a given door handle for sensor data 202 confirming the rain condition, compare readings from other capacitive sensor 106 locations of the vehicle 102 for sensor data 202 confirming the rain condition, or use onboard vehicle 102 sun load sensors to identify the sun load presented to the vehicle 102.

In decision point 416, the controller 108 determines whether the second-stage assessment confirms the rain condition. For example, if the rain sensor 112 indicates a wet condition, or if a humidity sensor confirms a humid condition, the controller 108 may identify the rain condition as confirmed, and may transition to block 418. Otherwise, the process 400 ends.

In block 418, the controller 108 initiates a window close action. For example, the controller 108 may initiate a close action to at least one power window actuator 110 (e.g., a close action for a door window, a vent window or a sunroof). For vehicles 102 that support the reporting of window position information, the controller 108 may be configured to record the positions of the windows before being closed, and may close only those windows indicated as being open. For vehicles 102 that do not support the reporting of windows position information, the controller 108 may, for example, record an amount of time taken to close a window until the power window actuator 110 indicates a closed condition. These times to close the window may also be stored.

In block 420, the controller 108 determines whether to update the lock state of any vehicle 102 doors. For example, based on the recorded window position information, the controller 108 may determine whether vehicle doors 102 are locked, and further whether any automatically closed windows were previously open greater than a particular threshold (e.g., a predefined distance or percentage amount open). In such a situation, the user may have intentionally left a window open to have access to the cabin of the vehicle 102. Since the open windows were closed in block 418, the user may no longer have access to the cabin and may effectively be locked out. Accordingly, if a closed window is determined to have been open greater than the particular threshold (e.g., distance or percentage open), then the controller 108 may unlock one or more vehicle 102 doors (e.g., the door with the automatically closed window previously open greater than the particular amount or percentage, all doors, etc.) to allow the user to maintain access to the vehicle 102 and not be locked out. As another example, the controller 108 may identify whether the PEPS key fob 104 is within a locked vehicle 102 cabin with automatically closed windows that were previously open greater than the particular threshold, and may unlock one or more vehicle doors 102 if these conditions are met. The controller 108 may also maintain a record of which doors 102 were automatically unlocked.

In block 422, the controller 108 determines a conclusion of the rain condition. For example, as discussed above with respect to FIGS. 2 and 3, the controller 108 may identify a capacitive change characteristic of the conclusion of a rain condition. In some cases, the controller 108 may further perform a second-stage assessment to confirm the conclusion of the rain condition, such as by way of a rain sensor 112 no longer indicating a wet condition, or a sun load sensor indicating a level of sun load consistent with the sun being out.

In block 424, the controller 108 initiates a window open action. For example, the controller 108 may initiate an open action to at least one power window actuator 110 (e.g., an open action for a door window, a vent window or a sunroof). For vehicles 102 that support the reporting of window position information, the controller 108 may be configured to reopen the windows to the recorded positions of the windows before being closed. For vehicles 102 that do not support the reporting of windows position information, the controller 108 may, for example, power the power window actuators 110 for recorded amounts of time taken to close the windows. In some examples, based on the recorded door unlock information, the controller 108 may also re-lock any doors that may have been automatically unlocked in block 420. After block 424, the process 400 ends.

Variations on the process 400 may be possible. For example, the controller 108 may rely on the capacitive change characteristic of a rain condition, without further performing the second-stage assessments in block 414 and decision point 416. As another example, before closing the windows, the controller 108 may send a message to the owner of the vehicle 102 to confirm that the windows should be closed, and may proceed to close the windows upon receiving a confirmation from the owner to proceed. As yet a further example, the controller 108 may not re-open the windows in block 424, or may request authorization from the owner of the vehicle 102 before re-opening the windows.

Thus, a vehicle 102 rain detection system 100 may be implemented that automatically closes windows upon detection of the rain condition using existing capacitive sensors 106 that may be free of both incremental part cost and incremental KOL. Moreover, additional add-on features or applications may be made possible by way of the rain detection system 100.

As an example, similar to the identification of rain due to a detected change in capacitance, the rain detection system 100 may similarly detect snow build-up on a stationary vehicle. Upon a determination of snow buildup, the rain detection system 100 may be configured to request for a telematics unit of the vehicle 102 to send a telematics alert to let the vehicle owner know additional time may be required to clean their vehicle or driveway of accumulated snow. As another possibility, upon the snow determination the rain detection system 100 may query the vehicle owner for whether the vehicle 102 should initiate a remote start action.

As another example, data from the rain detection system 100 may be forwarded to a data gathering system for aggregation and further processing. For example, vehicles 102 may provide rain activity data indicative of when rain conditions are detected (regardless of whether any windows were closed), along with location data for the vehicles 102. Based on the received data, the data gathering system may construct a weather map indicative of precipitation in the area in which the vehicles 102 may be located. Such a data gathering system may be particularly useful in relatively rural regions lacking adequate radar or weather gathering services, but in which vehicles 102 implementing the rain detection system 100 may be located.

In general, computing systems and/or devices, such as the controller 108, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the controller 108 generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controller 108 may be such computer program products. In some example, these computer program products may be provided as software that when executed by one or more processors provides the operations described herein. Alternatively, the computer program products may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

identifying, by a vehicle controller, a rain condition based on sensor data received from at least one capacitive handle of a vehicle;

ensuring an absence of a key fob in proximity of the at least one capacitive handle and an absence of a door-opening occurrence to confirm the rain condition; and initiating a closure action to a power actuator associated with an open vehicle window in response to the confirmed rain condition.

2. The method of claim 1, wherein the open vehicle window is one of a front door window, a rear door window, a window side vent, a sunroof, a moon-roof, and a convertible roof.

3. The method of claim 1, wherein identifying the rain condition includes an identification of a consistent change in capacitance across sensor data received from a plurality of capacitive door handles of the vehicle.

4. The method of claim 1, wherein the capacitive change characteristic of a rain condition includes identifying sensor data indicative of a capacitive charge beyond a capacitive detection threshold.

5. The method of claim 4, wherein the capacitive detection threshold is a threshold used to determine a potential presence of an owner by the at least one capacitive handle to initiate a door unlock sequence.

6. The method of claim 1, further comprising:

identifying that the open vehicle window is open greater than a predefined window threshold and that vehicle doors are locked; and changing a lock state of at least one of the vehicle doors to maintain access to the vehicle.

7. The method of claim 1, further comprising:

performing a second-stage assessment of a rain condition to confirm the rain condition; and initiating the closure action when the second-stage assessment confirms the rain condition.

8. The method of claim 7, wherein the second-stage assessment includes at least one of: receiving an indication of precipitation from a local weather information source, receiving information from an on-board humidity sensor indicative of high humidity, comparing readings from lock and unlock capacitive sensors on a given door handle for sensor data confirming the rain condition, comparing readings from other capacitive sensor locations of the vehicle for sensor data confirming the rain condition.

9. The method of claim 1, further comprising:

providing a message to a user indicating a reasonable probability of rain; and receiving confirmation to close the windows from the user responsive to the message.

10. The method of claim 1, further comprising:

determining that the rain condition has ceased; and returning any closed windows to their previous positions.

11. A system, comprising:

a plurality of capacitive sensors on an exterior of a vehicle; and a controller in communication with the plurality of capacitive sensors and configured to:

identify, by the controller, a rain condition based on sensor data received from at least one capacitive sensor of the plurality of capacitive sensors;

ensure an absence of a key fob in proximity of the at least one capacitive sensor and an absence of a door-opening occurrence to confirm the rain condition; and initiate a closure action to a power actuator associated with an open vehicle window in response to the confirmed rain condition.

12. The system of claim 11, wherein the controller is further configured to identify the rain condition according to at least one of:

identifying sensor data indicative of a consistent change in capacitance across sensor data received from a plurality of capacitive door handles of the vehicle; and identifying the rain condition according to measuring a capacitive charge beyond a capacitive detection threshold.

13. The system of claim 12, wherein the controller is further configured to utilize, as the capacitive detection threshold, a threshold to determine a potential presence of an owner by the capacitive sensor to initiate a door unlock sequence.

14. The system of claim 11, wherein the controller is further configured to:

identify that the open vehicle window is open greater than a predefined window threshold and that vehicle doors are locked; and change a lock state of at least one of the vehicle doors to maintain access to the vehicle.

15. The system of claim 11, wherein the controller is further configured to:

perform a second-stage assessment of a rain condition to confirm the rain condition; and initiate the closure action when the second-stage assessment confirms the rain condition.

16. The system of claim 11, wherein the controller is further configured to:

provide a message to a user indicating a reasonable probability of rain; and receive confirmation to close the windows from the user responsive to the message.

17. The system of claim 11, wherein the controller is further configured to:

determine that the rain condition has ceased; and return any closed windows to their previous positions.

18. A non-transitory computer readable medium storing a software program executable by a processor of a controller to provide operations comprising:

identifying, by the controller, a possible rain condition based on sensor data received from at least one capacitive handle of a vehicle;

ensuring an absence of a key fob in proximity of at least one locked door handle and an absence of a subsequent door-opening occurrence of an unlocked vehicle door to confirm the rain condition; and initiating a closure action to a power actuator associated with an open vehicle window in response to the confirmed rain condition.

19. The computer readable medium of claim 18, further executable by the processor of the controller to provide operations comprising identifying the rain condition according to at least one of:

identifying sensor data indicative of a consistent change in capacitance across sensor data received from a plurality of capacitive door handles of the vehicle; and identifying the rain condition according to measuring a capacitive charge beyond a capacitive detection threshold.

20. The computer readable medium of claim 19, further executable by the processor of the controller to provide operations comprising utilizing, as the capacitive detection threshold, a threshold to determine a potential presence of an owner by the at least one capacitive handle to initiate a door unlock sequence.

21. The computer readable medium of claim 18, further executable by the processor of the controller to provide operations comprising, wherein the controller is further configured to:

identify that the open vehicle window is open greater than a predefined window threshold and that vehicle doors are locked; and change a lock state of at least one of the vehicle doors to maintain access to the vehicle.

22. The computer readable medium of claim 18, further executable by the processor of the controller to provide operations comprising:

performing a second-stage assessment of a rain condition to confirm the rain condition; and initiating the closure action when the second-stage assessment confirms the rain condition.

23. The computer readable medium of claim 18, further executable by the processor of the controller to provide operations comprising:

providing a message to a user indicating a reasonable probability of rain; and receiving confirmation to close the windows from the user responsive to the message.

24. The computer readable medium of claim 18, further executable by the processor of the controller to provide operations comprising:

determining that the rain condition has ceased; and returning any closed windows to their previous positions.

* * * * *